United States Patent [19]

Maeda et al.

[11] Patent Number: 4,966,101
[45] Date of Patent: Oct. 30, 1990

[54] FLUIDIZED BED APPARATUS

[75] Inventors: Sadahiko Maeda, Tokyo; Yasumasa Idei; Shinji Matsurra, both of Ube, all of Japan

[73] Assignee: Ube Industries, Ltd., Yamaguchi, Japan

[21] Appl. No.: 349,771

[22] Filed: May 10, 1989

[30] Foreign Application Priority Data

| May 17, 1988 | [JP] | Japan | 63-118166 |
| Nov. 25, 1988 | [JP] | Japan | 63-152511[U] |
| Nov. 25, 1988 | [JP] | Japan | 63-152512[U] |
| Apr. 13, 1989 | [JP] | Japan | 1-93948 |

[51] Int. Cl.$^5$ .............................................. F22B 1/02
[52] U.S. Cl. .................................. 122/4 D; 110/245; 432/58
[58] Field of Search .................. 122/4 D; 110/245; 432/58

[56] References Cited

U.S. PATENT DOCUMENTS

| 4,279,207 | 7/1981 | Wormser | 110/345 |
| 4,499,857 | 2/1985 | Wormser | 122/4 D |
| 4,768,468 | 9/1988 | Idei et al. | 122/4 D |
| 4,800,846 | 1/1989 | Idei et al. | 122/4 D |

Primary Examiner—Henry C. Yuen
Attorney, Agent, or Firm—Kanesaka and Takeuchi

[57] ABSTRACT

A fluidized bed combustion apparatus has a gas dispersion plate provided in a lower part of a fluidizing chamber on which fluidizing mediums are fluidized to form a fluidized bed in which a fuel is combusted. The apparatus further includes a porous ceramic member so mounted in a combusted gas outlet of the fluidizing chamber as to transverse the outlet. Coating materials having a high radiation rate are applied on an inner wall surface of the fluidizing chamber and on the porous ceramic member surface directed to the fluidizing chamber. The porous ceramic member is perforated with holes each having a diameter larger than a particle diameter of a fluidizing medium. The apparatus is equipped with a unit for back-washing the filter. The apparatus also includes a plate, provided downwardly of the filter, for capturing the particles scattered from the fluidized bed. A fluidized bed type reforming furnace has a plurality of catalyst tubes arranged in vertical and horizontal direction while taking a horizontal posture in the fluidizing chamber positioned upwardly of the gas dispersion plate.

13 Claims, 7 Drawing Sheets

FLUIDIZED BED APPARATUS

FIELD OF THE INVENTION AND RELATED ART STATEMENT

The present invention firstly relates to a fluidized bed combustion apparatus for absorbing the heat evolved by burning a fuel in a fluidized bed of a fluidized bed reforming furnace or a fluidized bed boiler.

The present invention secondly relates to a fluidized bed combustion apparatus capable of effectively recovering a potential heat quantity of a combustion gas carried away from the fluidized bed of the fluidized bed combustion apparatus.

The present invention is thirdly directed to a fluidized bed combustion apparatus adapted to perform stable operations by preventing both a scattering discharge of fluidizing mediums to the outside of the apparatus and loading of a discharge preventing member.

The present invention is finally concerned with a fluidized bed type reforming furnace adapted to take a gas, the main component of which is hydrogen, out of steam and hydrocarbon gas such as a city gas and also to supply the gas to, e.g., a fuel cell.

As well known, a fluidized bed boiler supplies the fuel continuously into a fluidizing chamber and air through a distributor plate into the fluidizing chamber to combust the fuel, fluidize the fluidizing mediums, and perform heat exchange in heating tubes disposed within the fluidizing chamber. In this fluidized bed boiler an installation height of the heating tubes and a quantity of charged fluidized mediums are set such that the heating tubes are immersed in the fluidized bed.

In such a boiler, the heating tubes are immersed in the fluidized bed and the boiler is operated in an area in which the overall heat transfer coefficient is not lowered even if the air flow rate is lowered, which is a feature of heat transfer of the fluidized bed. Therefore, even if the fuel supply quantity and air supply quantity are reduced and the combustion heat of fuel is lowered when a boiler load is lowered, the heat transfer coefficient and a heat transfer surface area are not substantially lowered. Therefore, the fluidized bed may rapidly lower in temperature and not be able to operate.

In contrast, if the fuel supply quantity and air supply quantity are increased when the boiler load is increased, the temperature of the fluidized bed may rapidly increase to thereby cause a trouble such as a clinkering of the fluidizing mediums In order to cope with this, U.S. Pat. No. 4,279,207 discloses that when the boiler load increases, the quantity of fluidizing mediums increases, the contact area between the fluidizing bed and the heating tubes increases to thereby increase a heat quantity transferred from the fluidized bed to the heating tubes. It also discloses discharge of fluidizing mediums when the load decreases (especially, column 10, lines 54–62 and column 11, lines 7–14).

U.S. Pat. No. 4,499,857 discloses especially in column 4, lines 53–60 and in column 6, lines 17–19 that the height of the fluidizing mediums is controlled in accordance with the temperature of the fluidized bed.

Mining Engineering, page 244, right column, lines 12–19 and FIG. 7, published in U.S.A., Apr. 1986, discloses the height of the fluidized bed and the number of heating tubes immersed in the fluidized bed are changed in accordance with the load.

Another type of improved fluidized bed boiler is also disclosed in U.S. Pat. No. 4,768,468.

For instance, in the fluidized bed reforming furnace as a fluidized bed combustion apparatus, the execution of a reforming process involves the steps of burning the heating gas fuel in the fluidized bed to transfer the amount of heat evolved therein to catalyst tubes and adding the steam to the hydrocarbon gas in the catalyst tubes.

If the hydrocarbon gas is methane, steam reforming reaction may be expressed such as:

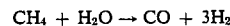

When a height of the fluidized bed of the fluidized bed reforming furnace is as small as 400~500 mm, and when a temperature of the fluidized bed is set at, e.g., 800° C. or thereabouts suited to effect the reforming process, the fuel gas is violently burnt in the vicinity of a fluidized bed surface (upper surface), while the gas fuel is partially combusted in a upper space. In consequence, the temperature of a combusted exhaust gas increases up to, e.g., 900° C. A heat quantity equivalent to 100° C. as a differential value between 900° C. and the temperature, i.e., 800° C., of the fluidized bed is not utilized for the reforming action but discharged from the reforming furnace, resulting in a loss of heat.

The fluidized bed boiler also presents the same phenomenon as above. Namely, even in a case where the fuel to be combusted in the fluidized bed is a coal as well as a gas, the fine powder thereof tends to be combusted in the vicinity of the fluidized bed surface or in the upper space.

On the other hand, this kind of combustion in the fluidized bed entails such a phenomenon that part of the fluidizing mediums are scattered outside the furnace in company with the combusted exhaust gas. A height of a free board unit has to be increased enough to prevent this phenomenon. This arrangement in turn, however, causes an increase in size of the apparatus.

There will herein be exemplified a well-known art (e.g., Saving of Energy, pp. 39~45, Vol. 35 No. 13, 1983, published by The Energy Saving Center Foundation) wherein a ceramic foamed material (ceramic porous material) provided at a gas outlet formed in the heating furnace equipped with a gas burner serve to absorb the heat emitted by the exhaust gas, and the heat radiated from the furnace surface having a high temperature is utilized for heating the substance to be heated.

There is, however, an unknown fashion in which the foregoing ceramic porous material is applied to the fluidized bed combustion apparatus of the present invention, the apparatus exhibiting such characteristics that the fluidizing mediums are apt to scatter out outside the furnace in company with the combusted gas, or the fuel like the gas, coal and so on is partly burnt outwardly of the furnace.

There arises, however, a problem inherent in the fluidized bed combustion apparatus for combusting the fuel by fluidizing the fluidizing mediums, wherein parts of the mediums escape into the upper space and adhere to holes of the ceramic porous material, thus causing the loading which in turn creates an obstacle to the discharge of the combusted gas.

Based on the prior art, the fluidized bed type reforming furnace includes a plurality of catalyst tubes disposed in the vertical direction. Lower parts of the tubes are embedded in a fluidized bed into which the fuel and air are supplied for combustion. The fluidizing mediums heated by this combustion are brought into contact with the catalyst tubes, thereby heating the tubes. The steam is added to the hydrocarbon fuel fed into the catalyst tubes, and the hydrocarbon fuel undergoes the reforming process by heating.

In the reforming furnace provided with the vertically arranged catalyst tubes, the fluidized bed increases in height enough to permit the embedment of overall catalyst tubes (from the upper ends to the lower ends) which extend in the vertical direction. For this reason, a stationary bed height (a height of the fluidizing mediums when they are not fluidized) is approximately one-half as small as the length of the catalyst tube. The relatively high fluidized bed causes a remarkable increment in pressure difference thereof, resulting in a large loss of power of a blower for supplying the air into the fluidized bed. Besides, the fluidizing mediums are scattered high as the height of the fluidized bed increases. It is therefore required that the free board be rendered high. A height of the furnace body also rises.

The conventional fluidized bed type reforming furnace in which the catalyst tubes are arranged in the vertical direction has a characteristic peculiar to the fluidized bed, wherein it is possible to keep an intra-furnace temperature constant. Additional advantages are that a distribution of temperatures of the catalyst tubes can be reduced to provide uniform heat transfer, and a velocity at which to respond to the variations in load can be increased. While on the other hand, the height of the fluidized bed is not rectilinearly proportional to a superficial velocity. For instance, in a range where the superficial velocity is relatively small, the height of the fluidized bed considerably increases with larger superficial velocity. Whereas in a range where the superficial velocity is relatively large, even when increasing the superficial velocity, the fluidized bed does not remarkably rise in height. Hence, even if the superficial velocity is reduced down to one-half, a rate at which the fluidizing mediums contact the vertically disposed catalyst tubes is not decreased down to one-half. As a result, when decreasing the superficial velocity, there grows a ratio of the amount of heat taken out of the fluidized bed to the amount of heat evolved from the fuel, whereas the temperature of the fluidized bed goes down. In consequence of this, a predetermined reforming process corresponding to the load of the reforming furnace can not be performed.

OBJECT OF AND SUMMARY OF THE INVENTION

It is a primary object of the present invention to provide a fluidized bed combustion apparatus capable of increasing a thermal efficiency by reducing an amount of lost heat, preventing the scattering of fluidizing mediums and the loading, and also effecting smooth operations by preventing the loading.

Another object of the invention is to provide a fluidized bed type reforming furnace which exhibits such advantages that a height of a fluidized bed can be reduced, losses of pressure and of power can be diminished, a height of a furnace body is not larger than required, variations in temperature of the fluidized bed can be minimized with respect to fluctuations in load of a reforming furnace, and further a predetermined reforming process corresponding to the load can be effected.

According to one aspect of the invention, there is provided a fluidized bed combustion apparatus comprising: a gas dispersion (distributing) plate installed at a lower part of a fluidizing chamber; and a fluidized bed formed by fluidizing the fluidizing mediums on the gas dispersion plate (distributor), whereby a fuel is burnt in the fluidized bed, characterized by a filter so mounted in a combusted gas outlet or on a free board unit of the fluidizing chamber as to traverse the free board unit or the gas outlet.

The filter may preferably involve the use of wire gauze or a porous ceramic plate.

In this fluidized bed combustion apparatus, the exhaust gas burnt in the fluidized bed flows via the free board positioned higher than the fluidized bed into the outlet of the fluidizing chamber. The exhaust gas passes through the filter and is discharged into a discharge duct, at which time the exhaust gas imparts the heat to the filter which in turn rises in temperature. The filter then radiates the heat. The radiant heat is subsequently absorbed by the fluidizing mediums in the fluidized bed preparatory to an effective use for reforming action of the reforming furnace or generation of steam of the boiler.

The filter performs a function to prevent the scattering of the fluidizing mediums from the outlet, thereby stably carrying out the combustion in the fluidized bed without causing the variations in amount of the fluidizing mediums.

According to another aspect of the invention, there is provided a fluidized bed combustion apparatus comprising: a gas dispersion plate installed at a lower part of a fluidizing chamber; and a fluidized bed formed by fluidizing the fluidizing mediums on the gas dispersion plate, whereby a fuel is burnt in the fluidized bed, characterized in that: a filter is so mounted in a combusted gas outlet or on a free board of the fluidizing chamber as to transverse the free board or the gas outlet; a combusted gas discharge duct provided on the lower stream side in the flowing direction of the combusted gas than the portion on which the filter is mounted is sectioned into a plurality of sub-ducts in such a direction as to transverse the duct; and each of the thus sectioned compartments is equipped with a valve and a gas supplying nozzle, interposed between the valve and the filter, for back-washing the filter.

In this fluidized bed combustion apparatus, similarly the exhaust gas imparts the heat to the filter, and it follows that wire gauze or a porous member radiates the heat. The radiant heat is then absorbed by the fluidizing mediums preparatory to the effective use for the reforming action of the reforming furnace or the generation of steam of the boiler.

The filter serves to prevent the scattering of the fluidizing mediums from the outlet, whereby the combustion in the fluidized bed is effected with stability, causing no variation in amount of fluidizing mediums. During such steps, operation is made for the valves of the plurality of compartments obtained by sectioning the discharge duct disposed on the lower stream side than the position in which the filter is installed. As a result of the valve operation, particles stuck to the filter are eliminated. More specifically, the exhaust gas is discharged into the discharge duct by opening the valve of a given compartment, while the valves of other compartments remain closed. In this state, the back-washing gas is jetted out of the gas nozzle, whereby the back-washing gas impinges upon the filter of the portion at which that valve is positioned, flowing from the opposite side of the fluidizing chamber to a free board of the fluidizing chamber The fluidizing mediums adhered to the filter are removed, thus preventing the loading of the filter. These operations are performed sequentially for each of the sectioned compartments, and the continuous processes are effected with stability.

According to still another aspect of the invention, there is provided a fluidized bed combustion apparatus comprising: a gas dispersion plate installed at a lower part of a fluidizing chamber; and a fluidized bed formed by fluidizing the fluidizing mediums on the gas dispersion plate, whereby a fuel is burnt in the fluidized bed, characterized in that a filter is mounted to transverse a free board or a combusted gas outlet, and plates for capturing particles scattered from the fluidizing bed are provided downwardly of the filter.

In accordance with the present invention, the plurality of scattered-particle capturing plates are arranged substantially in the up-and-down directions, and passageways for the combusted gas are formed between the scattered-particle capturing plates. Provided downwardly of the capturing plates are a shutter capable of intermittently controlling a flow of gas into the passageways, or an oscillator for giving oscillations to the filter.

In this fluidized bed combustion apparatus, the exhaust gas burnt in the fluidized bed runs into the fluidizing chamber outlet through the free board disposed above the fluidized bed. In the meantime, the scattered-particle capturing plates capture a good number of fluidizing medium particles and return them to the fluidized bed.

The exhaust gas containing a small amount of particles passing through the scattered-particle capturing plates reaches the filter mounted in the outlet or on the free board. The gas is discharged outside the furnace after passing through the filter, while the particles are caught by the filter.

The exhaust gas imparts the heat to the scattered-particle capturing plates and the filter when passing therethrough, and it follows that the plates and the filter come to have high temperatures. Then these components emit the radiant heat. Subsequent to this step, the radiant heat is absorbed by the fluidizing mediums existing in the fluidized bed and is further effectively employed for the reforming action of the reforming furnace or the generation of steam of boiler.

Note that the filter heat is emitted directly to the fluidizing mediums in the fluidized bed, or temporarily transferred to the scattered-particle capturing plates and emitted therefrom to the fluidizing mediums in the fluidized bed.

The scattered-particle capturing plates and the filter cooperate to prevent the scattering of the fluidizing mediums from the outlet, thereby effecting the stable combustion in the fluidized bed with no variation in amount of the fluidizing mediums.

On the basis of this fluidized bed combustion apparatus, the oscillations are given to the filter, and the particles stuck to the filter are thereby eliminated. Particularly on the occasion of causing the oscillations, the filter is oscillated in a state where the gas flows into the part of filter which is positioned upwardly of the closed gas passageways when effecting the oscillations by closing some gas passageways formed between the scattered-particle capturing plates with the aid of the shutter. In this manner, the particles are surely be removed from the filter.

As discussed above, the oscillations are given to the filter in combination with the shutter, and the particles can thereby be cleared off by sequentially closing the combustion gas passageways. This permits continuous operations with remarkable stability.

According to a further aspect of the invention, there is provided a fluidized bed combustion apparatus characterized in that any one or both of the filter and an inner surface of the fluidizing chamber is or are coated with a coating material having a high radiation rate.

Where the filter or the wall inner surface of the the furnace of the combustion apparatus is coated with the coating material having a higher radiation rate than that of the filter, the radiant heat can be utilized at a higher efficiency, with the result that a temperature of the combusted gas at the outlet of the ceramic member can be decreased down to a level approximate to the fluidized bed temperature.

Note that the above-described filter may preferably, as in the previous case, involve the use of a porous ceramic plate or wire gauze. The porous ceramic plate is preferably 50 mm or thereabouts in thickness. The porous ceramic plate also has a void percentage of, preferably, 85~90%, a high radiation rate (0.75~0.8) and a high temperature resistant property as well. The above-mentioned coating material (preferably, for example, CHIRANO COAT (trade mark) made by Ube Industries, Ltd.) is composed mainly of polymer which exhibits heat-resistant and anti-corrosive properties, the material being transformed into ceramics at high temperatures of 200~700° C. to have a high radiation rate (0.9). The porous ceramic plate has a hole diameter preferably smaller than a particle diameter (generally, 0.3~1.0 mm) of the fluidizing medium.

The wire gauze is preferably formed of stainless steel, and a hole diameter thereof is preferably smaller than the particle diameter of the fluidizing medium. The hole diameter is typically less than 1 mm and particularly 0.3 mm or under, but preferably larger than 0.05 mm and particularly 0.1 or above.

In accordance with another embodiment of the present invention, a fluidized bed type reforming furnace of the invention comprises: a fluidizing chamber; catalyst tubes filled with catalysts and provided in the fluidizing chamber, these tubes receiving a hydrocarbon fuel and steam; a fluidized bed for heating the catalyst tubes from outside to convert the hydrocarbon fuel into a gas whose main component is hydrogen, characterized in that the plurality of catalyst tubes are arranged horizontal and vertical directions respectively to assume a horizontal posture in the fluidizing chamber disposed higher than a gas dispersion plate.

The horizontal catalyst tube includes a helical band extending in its longitudinal direction along the tube inner peripheral wall, the tube being filled with the catalysts with the maximum density. As a preferable catalyst, there is exemplified G-56H-1 available from Nissan Gardler Corp. or R-67-7H made by Topso Corp., U.S.A.. A diameter of the catalyst is preferably 3~30 mm, more preferably 5~20mm.

The above-described gas dispersion plate consists of two pieces of partition plates disposed with air spaces formed in the vertical direction and a multiplicity of gas nozzles penetrating the partition plates in the up-and-down direction. The air spaces serves as gas fuel supply passageways. The gas dispersion plate is constructed such that the walls of gas nozzle positioned in the gas fuel supplying passageway is perforated with small holes through which the gas fuel is introduced.

Based on the arrangement that the plurality of catalyst tubes are placed in the vertical and horizontal directions respectively, a setting height of each of the catalyst tubes or a heightwise spacing at which the catalyst tubes are placed correlate to an amount of the fluidizing mediums charged. The setting height and the heightwise spacing can adjustably set to vary a rate at which the fluidizing mediums are brought into contact with the catalyst tubes, i.e., the number of tubes embedded in the fluidized bed when the height of the fluidized bed is changed corresponding to the fluctuations in load of the reforming furnace. Then, it follows that a total amount of heat transferred from the fluidized bed to the catalyst tubes in accordance with an increase or decrease in load (gas quantity) of the reforming furnace. A width of fluctuations in temperature of the fluidized bed can thus be minimized. It is therefore feasible to steer clear of a situation where the fluid bed temperature decreases after effecting a good deal of heat exchange as in the case of placing the conventional catalyst tubes in the vertical direction, even when the reforming furnace load drops down. Consequently, the reforming furnace can be stably operated even if the load is small.

The horizontal placement of the catalyst tubes permits an extreme decrease in height of a stationary bed of the fluidizing mediums, relating it to the above-mentioned setting height, thus obtaining a so-called a shallow bed. For this reason, a loss of pressure of the fluidizing gas can be diminished, and a loss of power is likewise reduced.

It is also possible to reduce the height at which the fluidizing mediums are scattered, and the free board can also be restrained low. This contributes to a reduction in size of the reforming furnace.

Under such circumstances, the fluidized bed type reforming furnace according to the present invention exhibits the characteristics inherent in the heat transfer of the fluidized bed. The reforming furnace is capable of uniformly transferring the heat to the catalyst tubes and reforming the hydrocarbon fuel at a high efficiency while maintaining a sufficiently high velocity of responding to the variations in load.

A helical band is formed on the inner wall surface of the catalyst tube charged with the catalysts with the maximum density. This arrangement, if the catalyst tube is horizontally disposed, prevents the catalysts to the greatest possible degree from being sparse in the upper portion when the catalysts concentrate in the lower portion by self-weights. Even if a spatial part is shaped in the upper portion, the helical band acts to produce a gyratory flow of gas running through the tube, and hence the gas flows only through the upper gap but does not flow on the downstream side. In this way, it is possible to avoid a situation where some parts of the catalyst tube abnormally rise in temperature. The helical band also contributes to further amelioration in coefficient of heat transfer of a charged layer.

The gas fuel is introduced into the multiplicity of gas nozzles of the gas dispersion plate, and subsequently supplied into the fluidized bed together with the fluidizing air. At this time, the gas fuel is uniformly spread over within the fluidized bed and combusted there to keep the fluidized bed temperature constant. The plurality of catalyst tubes extending long in the lateral directions are thus heated with uniformity.

BRIEF DESCRIPTION OF THE DRAWINGS

Other objects and advantages of the invention will become apparent during the following discussion in conjunction with the accompanying drawings, in which.

DESCRIPTION OF THE PREFERRED EMBODIMENTS

Figure 1:
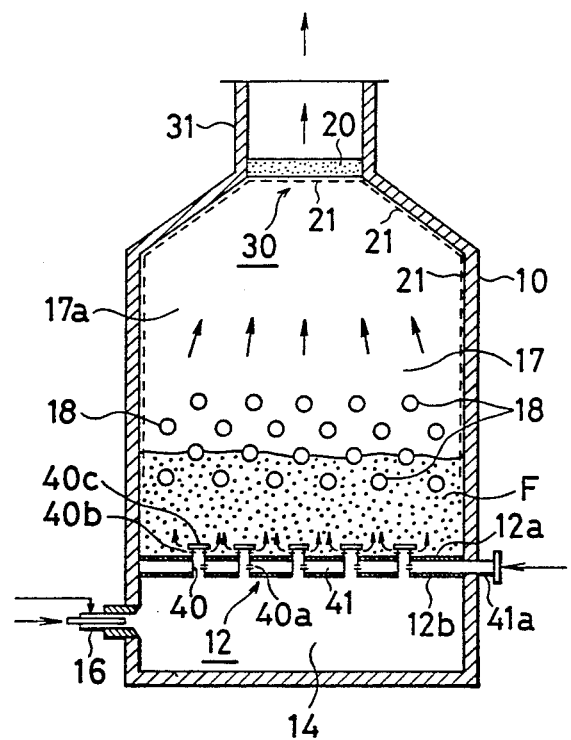
FIG. 1 is a vertical sectional view illustrating one embodiment of the present invention.

Turning first to FIG. 1, there is illustrated a vertical sectional view of a fluidized bed reforming furnace conceived as a fluidized bed combustion apparatus in an illustrative embodiment of the present invention.

This type of reforming furnace behaves to produce hydrogen gas by reforming hydrocarbon gas such as a city gas into steam. The hydrogen gas is supplied to a fuel cell (not illustrated).

A reforming furnace body generally designated at 10 comprises a gas dispersion plate 12 so placed on the bottom provided therein as to transverse the furnace interior. Sectioned downwardly of gas dispersion plate 12 is a combustion chamber 14 the furnace wall of which is equipped with a gas burner 16. Burner 16 is connected to an unillustrated gas supply tube and air supply tube.

Formed above gas dispersion plate 12 is a fluidizing chamber 17 in which a multiplicity of catalyst tubes 18 are arranged. Catalyst tubes 18 each assuming a horizontal posture are disposed at multi-stages in the up-and-down direction. It is to be noted that in this embodiment catalyst tubes 18 are vertically arrayed at four stages in a zigzag configuration. Each catalyst tube 18 is filled with catalysts for reforming hydrocarbon gas into steam, such as vanadium or nickel.

The reference symbol F represents a fluidized bed shaped by fluidizing mediums such as sands or alumina having a small particle diameter. The symbol 17a denotes a free board formed upwardly of fluidizing bed F. An exhaust gas outlet 30 is provided above fluidizing chamber 17.

Catalysts tubes 18 are fed with hydrocarbon fuel such a city gas as well as with steam.

Gas dispersion plates 12 are composed of upper partition plates 12a and lower partition plates 12b which are so disposed at spacings in the up-and-down direction as to transverse furnace body 10. Formed between upper and lower partition plates 12a and 12b are spatial portions each constituting a gas fuel supply passageway.

Gas nozzles 40 are fixedly formed to vertically penetrate upper and lower partition plates 12a and 12b. Gas fuel introduction holes 40a are perforated in gas nozzle wall surfaces corresponding to gas fuel supply passageways 41. The lower ends of gas nozzles 40 are open to communicate with combustion chamber 14. Formed in the upper portions of gas nozzles 40 are blow-out holes 40b for jetting into the fluidizing chamber 17 the gas burnt in combustion chamber 14 or the gas fuel led in from gas fuel introduction holes 40a. Fitted to the upper ends of gas nozzles 40 are cover members 40c for hindering the fluidizing mediums from permeating into blow-out holes 40b. Gas fuel supply ports 41a are formed in the wall of furnace body 10 to communicate with gas fuel supply passageways 41.

A porous ceramic member 20 is provided at an exhaust gas outlet 30 as to transverse the outlet. A coating material 21 is, as indicated by a broken line of the Figure, applied on the ceramic member 20 surface directed to fluidizing chamber 17 as well as on the inner wall surface of furnace body 10, viz., the furnace wall inner surface positioned higher than a height at which catalyst tubes 18 are placed in fluidizing chamber 17.

The description will next be focused on the operation of the thus constructed fluidized bed reforming furnace.

The gas fuel like the city gas and the air are fed to gas burner 16 which in turn combusts the gas fuel in combustion chamber 14. Subsequently, the combusted fuel is led from gas nozzles 40 into fluidizing chamber 17. Another gas fuel (e.g., an off-gas of a fuel supply) is introduced via fuel supply port 41a to gas fuel supply passageways 41 formed in gas dispersion plate 12. The gas fuel is then supplied via introduction holes 40a and blow-out holes 40b of gas nozzles 40 into fluidizing chamber 17.

The gas fuel coming from combustion chamber 14 and also the gas fuel from gas fuel supply passageways 41 are introduced into fluidizing chamber 17, whereby the fluidizing mediums charged in fluidizing chamber 17 are fluidized and heated to form fluidized bed F. Simultaneously, the gas fuel is spread over within fluidized bed F and are combusted there, and it follows that fluidized bed F is heated more uniformly.

Catalyst tubes 18 are supplied with hydrocarbon fuel gas like the city gas and the steam.

Catalyst tubes 18 are heated by fluidized bed F which has been heated, whereby gradually decomposing the hydrocarbon fuel like the city gas which passes through the catalysts such as vanadium or nickel charged in catalysts tubes 18. The thus decomposed fuel is reformed into a gas chiefly composed of hydrogen and carbon monoxide. The reformed gas is taken out of catalyst tubes 18, and the resultant hydrogen is supplied to the fuel cell.

The exhaust gas combusted in fluidized bed F flows from free board 17a to exhaust gas outlet 30 and then passes through porous ceramic member 20 provided thereat. The exhaust gas further runs into a discharge duct 31. During this process, porous ceramic member 20 is heated by heat emitted from the exhaust gas and the radiant heat is thereby emitted mainly on the upstream side (on the side of fluidized bed F). The radiant heat is absorbed by the fluidizing mediums which are in turn heated for utilization for the reforming process.

The reforming furnace including porous ceramic member 20 provided at combusted gas outlet 30 is operated on a condition that a temperature of fluidized bed F is set at 800° C., and when the combusted gas at inlets of porous ceramic member 20 reaches 900° C. due to the combustion in free board 17a, the temperature of the combusted gas at outlets of porous ceramic member 20 is approximately 810° C. Where the surface of porous ceramic member 20 is coated with CHIRANO COAT defined as coating material 21 having a high radiation rate, the exhaust gas temperature drops down to 800° C. approximate to the temperature of fluidized bed F. In this case, a difference of a radiant heat quantity Q given by the following formula is produced theoretically in accordance with a difference between a radiation rate, $\epsilon 1 = 0.9$, of CHIRANO COAT conceived as a coating material and a radiation rate, $\epsilon 1 = 0.75$, of porous ceramic member 20.

$$Q = 4.88 \times \left\{ \left( \frac{273 + t_1}{100} \right)^4 - \left( \frac{273 + t_2}{100} \right)^4 \right\} \times \epsilon 1 \times \epsilon 2 \times A$$

where Q is the heat quantity (Kcal/hr), t1 is the temperature (°C.) of wall surface, t2 is the temperature (°C.) of fluidizing mediums, and $\epsilon 2$ is the radiation rate of the fluidizing mediums.

On the other hand, during the operation, some of the fluidizing mediums are scattered upwards in company with the exhaust gas which has been combusted, and try to escape out of exhaust gas outlet 30. At this time, the scattered particles are captured by porous ceramic member 20, thus hindering the scattering thereof. The fluidizing mediums are not discharged from fluidizing chamber 17 into the outside of the furnace at all. A loss of the fluidizing mediums is not created. For this reason, the constantly stabilized fluidization can be obtained in fluidizing chamber 17, and the combustion is also stably performed. In addition, a means for capturing the particles is not separately required. Fluidizing chamber 17 does not therefore increase in configuration, this leading to a reduction in size of the combustion apparatus.

Figure 2:
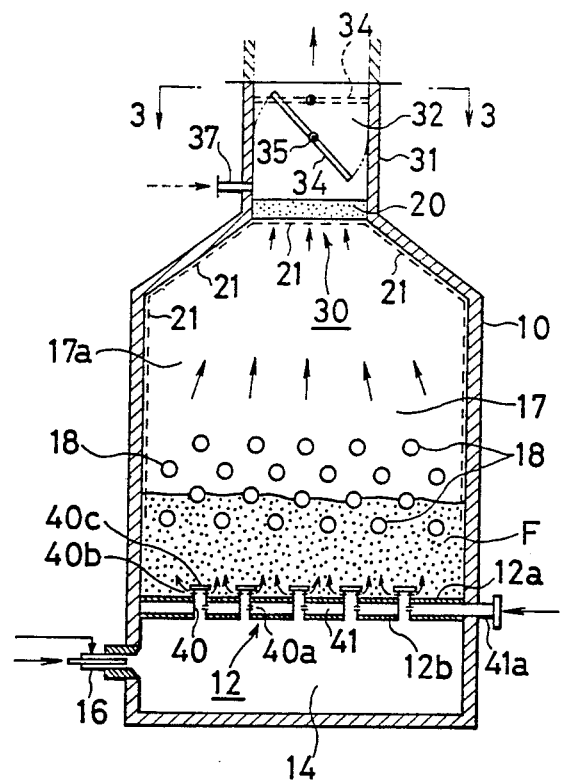
FIG. 2 is a vertical sectional view illustrating another embodiment of the present invention.
Figure 3:
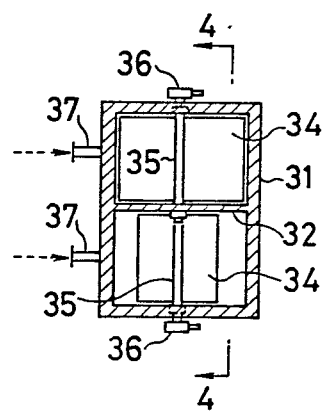
FIG. 3 is a sectional view taken substantially along the line 3—3 of FIG. 2.
Figure 4:
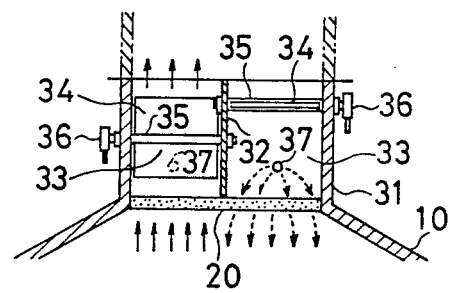
FIG. 4 is a section view taken along the line 4—4 in FIG. 3.

Referring to FIG. 2, there is shown a vertical sectional view of a fluidized bed reforming furnace conceived as a fluidized bed combustion apparatus in another embodiment of the present invention. FIG. 3 is a plan view taken in the direction of arrows substantially along the line 3—3 of FIG. 2, depicting a combusted gas outlet. FIG. 4 is a sectional view taken substantially along the line 4—4 of FIG. 3.

A difference arrangement between the apparatus depicted in FIGS. 2 to 4 and the apparatus illustrated in FIG. 1 will hereinafter be described.

Provided in combusted gas discharge duct 31 disposed on the gas downstream side lower than porous ceramic member 20 is a dispersion plate 32 to split the cross section of the duct into two parts so that the dispersion plate extends at a predetermine distance from the surface of porous ceramic member 20 in such a direction as to follow a gas flow. Duct 31 of that portion is formed with two compartments 33. Each compartment 33 is equipped with a valve 34 rotatable about a valve shaft 35. Valve shaft 35 of each compartment 33 is axially supported on a bearing between an external wall surface of discharge duct 31 and gas dispersion plate 32. Secured to an axial end of valve shaft 35 on the side of the external surface of discharge duct 31 is a driving lever 36 connected to an unillustrated driving source such as an air cylinder. Valves 34 of the respective compartments are independently adapted to open and close. Valve shafts 35 of two compartments 33 are disposed to slightly deviate in the up-and-down direction.

Between valve shaft 35 and porous ceramic member 20, two compartments 33 are provided with gas nozzles 37 for supplying back-washing gas of porous ceramic member 20. Unillustrated compressed air pipes are connected to gas nozzles 37.

Other configurations are the same as those shown in FIG. 1. Different operations of the apparatus from those shown in FIG. 1 will be explained.

Part of the fluidizing mediums is scattered upwards in company with the combusted exhaust gas during the operation and make an attempt to escape from exhaust gas outlet 30. At this time, the scattered particles are captured by porous ceramic member 20 provided at outlet 30. The scattering of the particles is thus prevented. The fluidizing mediums are not discharged from fluidizing chamber 17 into the outside of the furnace. A loss of the fluidizing mediums is prevented in this manner. As discussed above, the particles seized by porous ceramic member 20 will later be separated therefrom. The separation of particles from ceramic member 20 involves the steps of, as illustrated in the Figures, flowing the exhaust gas into discharge duct 31 while one of valves 34 provided in two-divided compartments 33 remains open (a state of left compartment 33 in FIG. 4), subsequently closing the other valve 34, supplying the back-washing gas from gas nozzles 37 by substantially tightly closing a space between valve 34 and porous ceramic member 20 (a state of right compartment 33 in FIG. 4), and back-washing porous ceramic member 20 positioned in closed compartment 33. Note that the arrows of broken lines indicate flows of the back-washing gas. The thus separated particles drop down into fluidized bed F. Next, valve 34 of compartment 33 in which the back-washing has now been effected is opened, whereas valve 34 of compartment 33 in which the exhaust gas is being discharged is closed. Porous ceramic member 20 positioned at that portion undergoes the back-washing. Such change-over back-washing process is periodically or consecutively carried out during the operation. The smooth operation is stably performed without causing any loading in porous ceramic member 20. As a matter of course, during the normal operation both of valves 34 are opened; and the valves may alternately be opened and closed only during the back-washing process.

The discharge of the fluidizing mediums from fluidizing chamber 17 can be effectively prevented, thereby making the stable fluidization therein. Hence, the stable combustion can be attained, and the means for capturing the particles is not separately needed. This contributes to a decrease in configuration of fluidizing chamber 17, which conduces to the miniaturization of the combustion apparatus.

Figure 5:
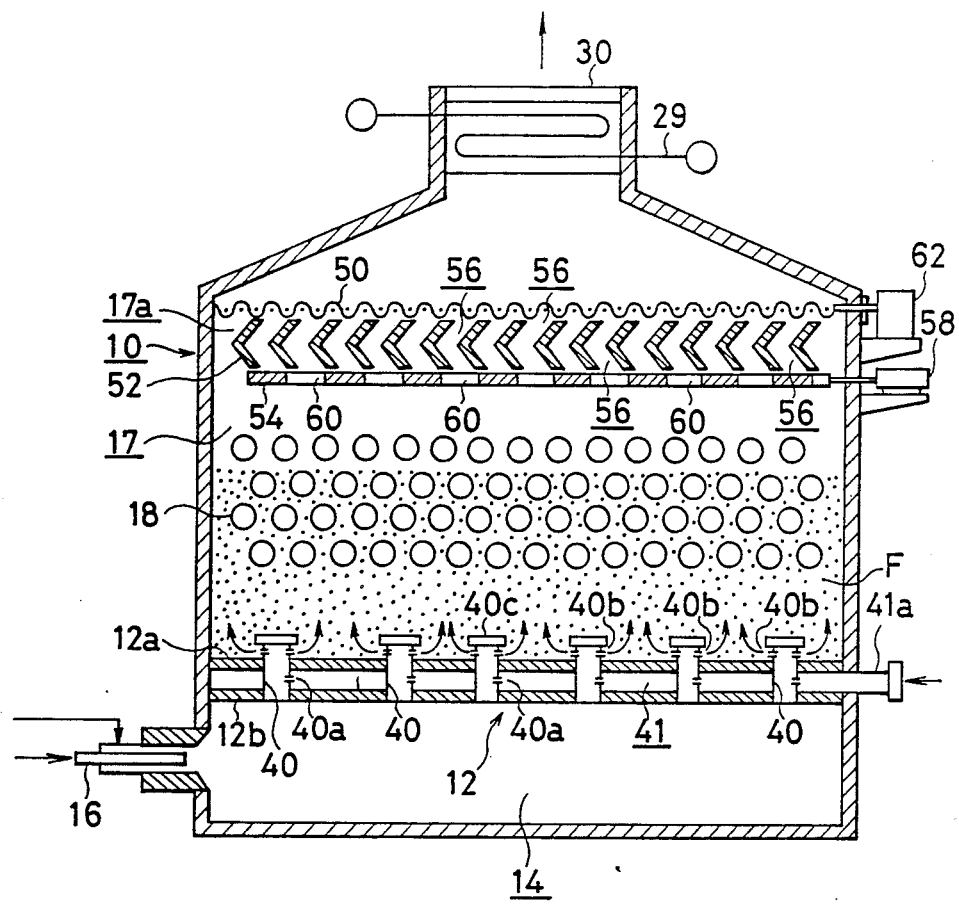
FIG. 5 is a vertical sectional view showing still another embodiment of the present invention.
Figure 6:
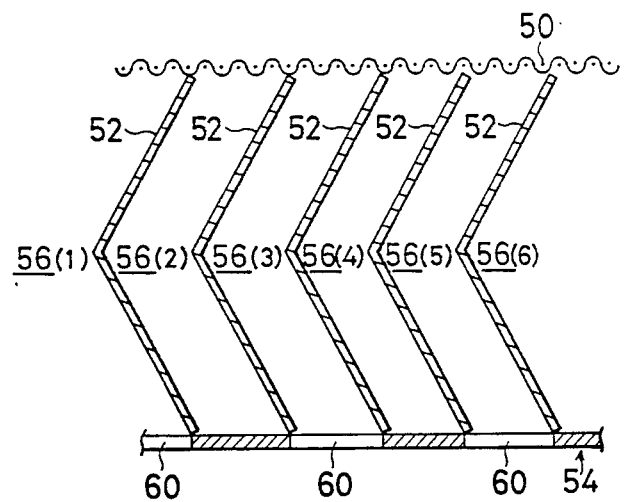
FIGS. 6 and 7 are vertical sectional views of assistance in explaining the function of a shutter plate, each depicting the interior of an apparatus.
Figure 7:
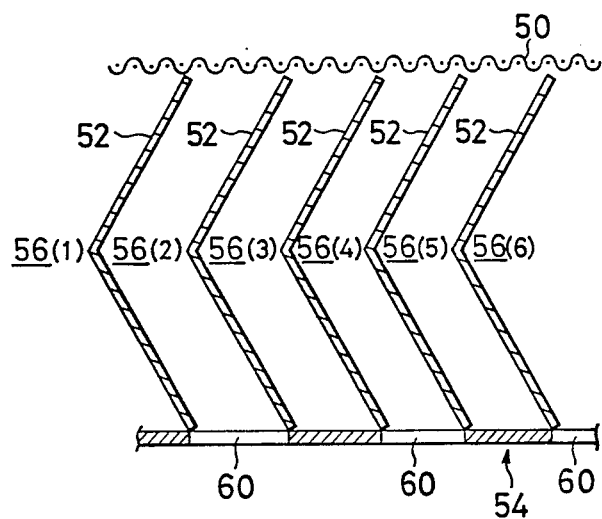

FIG. 5 is a vertical sectional view depicting a fluidized bed reforming furnace conceived as a fluidized bed combustion apparatus in still another embodiment of the present invention. FIGS. 6 and 7 are enlarged views each illustrating the principal portion thereof. A different arrangement of the apparatus shown in FIGS. 5 to 7 from that of FIG. 1 will hereinafter be explained.

Disposed at outlet 30 is a heat transfer pipe 31 used for recovering the waste heat and adapted to heat the air or fuel supplied to combustion chamber 14 or the fuel which is, as will be mentioned later, fed to a supply port 41.

Wire gauze 50 is, as illustrated in FIGS. 6 and 7, provided upwardly of free board 17a to transverse within furnace body 10. Mounted downwardly of wire gauze 50 is a scattered particle capturing plate 52 for capturing the particles of fluidizing mediums scattered from fluidized bed F. In this embodiment, scattered particle capturing plate 52 is disposed so that the upper end thereof is contiguous to wire gauze 50. A shutter plate 54 is provided under scattered particle capturing plate 52.

In accordance with this embodiment, scattered particle capturing plate 52 is composed of a crooked tabular member. The surfaces of scattered particle capturing plate 52 are directed up and down. Combusted gas passageways 56 (marked with the numerals (1)~(6) in FIGS. 6 and 7) are formed between scattered particle capturing plates 52 and between the inner wall surface of furnace body 10 and scattered particle capturing plates 52.

Shutter plate 54 is driven in the horizontal direction by a driving unit 58 such as an air cylinder installed outside furnace body 10. Shutter plate 54 is perforated with openings 60 each having a width equal to a spacing between scattered particle capturing plates 52, the openings being provided at this spacing. Shutter plate 54 is, as depicted in FIGS. 6 and 7, adapted to open passageways 56 alternately. Referring to FIG. 6, passageway groups 56(1), 56(3) and 56(5) are opened, whereas passageway groups 56(2), 56(4) and 56(6) are closed. Upon actuation of driving unit 58, as shown in FIG. 7, passageway groups 56(2), 56(4) and 56(6) which have been closed by shutter plate 54 are then opened through openings 60. In sharp contrast, passageway groups 56(1), 56(3) and 56(5) which have been opened through openings 60 are then closed by shutter plate 54.

As a matter of course, the gas flows through only passageway groups 56(1), 56(3) and 56(5) in a state of FIG. 6. Whereas in a state of FIG. 7, the gas runs through only passageway groups 56(2), 56(4) and 56(6).

Installed outside furnace body 10 is an oscillation unit 62 such a hammer device for imparting oscillations to wire gauze 50. Wire gauze 50 is oscillated by oscillation unit 62, thus clearing off the particles stuck to the wire gauze.

Different operations of the apparatus depicted in FIGS. 5 to 7 from those of FIG. 1 will hereinafter be described.

The exhaust gas burnt in fluidized bed F passes through openings 60 formed in shutter plate 54 and enters passageways 56 between scattered particle capturing plates 52. Passageways 56 assume crooked configuration to change the direction of gas flow, with the result that the great majority of particles concomitant with the gas impinge upon scattered particle capturing plates 52. Immediately the particles drop down on fluidized bed F. Some of the particles passing through passageways 56 together with the combusted gas are adhered to wire gauze 50, and the remaining particles flow into exhaust gas outlet 30 together with the combusted gas. The combusted gas undergoes a heat exchange with heat transfer pipe 31 provided at outlet 30 and is discharged outside furnace body 10.

Meanwhile, wire gauze 50, scattered particle capturing plates 52 and shutter plate 54 are heated by the heat evolved by the exhaust gas, and the radiant heat is emitted to fluidized bed F. The radiant heat is then absorbed by the fluidizing mediums existing in fluidized bed F. The fluidizing mediums are in turn heated for utilization for the reforming process. Note that the heat of wire gauze 50 is imparted directly to fluidized bed F, or radiated as radiant heat or transferred to scatterd particle capturing plates 52, and the radiant heat is given from scattered particle capturing plates 52 to fluidized bed F.

Some amount of the carried-away heat of the exhaust gas is returned to fluidized bed F via wire gauze 50, scattered particle capturing plates 52 and shutter plate 54. Consequently, the energy required for the reforming process can be reduced, which conduces to a drop in amount of the fuel consumed.

In the reforming furnace depicted in FIGS. 5 through 7, the apparatus is operated under such a condition that a temperature of fluidized bed F is set at 780° C. A temperature of the combusted gas under wire gauze 50 reaches 880° C. by the combustion in free board 17a. In this case, it can be recognized that the temperature of the combusted gas above wire gauze 50 is approximately 790° C., and the heat quantity corresponding to this temperature difference is recovered.

The fluidizing mediums are partly scattered upwards in company with the combusted exhaust gas. The scattered particles are, however, captured by scattered particle capturing plates 52 as well as by wire gauze 50. Therefore, the fluidizing mediums are not discharged outside the furnace from fluidizing chamber 17, thus preventing a loss of the fluidizing mediums.

In accordance with the present invention, the provision of scattered particle capturing plates 52 reduces an amount of the particles adhered to wire gauze 50. However, the particles are stepwise stuck to wire gauze 50 as the fluidized bed combustion apparatus continues to be operated. With the intention of clearing off the adhered particles, oscillation unit 62 is actuated to cause the oscillations of wire gauze 50. Upon oscillations of wire gauze 50, the particles adhered thereto are cleared off. In particular, the flow of gas is not blown on wire gauze 50 positioned above passageways 56 (56(2), 56(4) and 56(6) in FIG. 6) which have been closed by shutter plate 54. Hence, the particles are almost completely cleared off immediately when the oscillations are applied. It is to be noted that the particles removed from wire gauze 50 and accumulated on shutter plate 54 then drop down from shutter plate 54 on fluidized bed F when horizontally moving the shutter plate.

When moving and bringing shutter plate 54 into a state shown in FIG. 7, passageways groups 56(1), 56(3) and 56(5) which have remained open are now closed. Instead, passageway groups 56(2), 56(4) and 56(6) are unclosed. Subsequently, when applying the oscillations to wire gauze 50, the particles are almost completely cleared off from wire gauze 50 above open passageway groups 56(2), 56(4) and 56(6).

As discussed above, either passageway groups 56(1), 56(3) and 56(5) or passageway groups 56(2), 56(4) and 56(6) come into the opening state even when moving shutter plate 54, and hence the combusted gas flows upwards within fluidizing chamber 17.

The particles adhered to wire gauze 50 can surely be removed from wire gauze 50 while continuously operating the fluidized bed combustion apparatus.

In the above-described embodiment, there are provided oscillation unit 62 and the shutter device (consisting of shutter plate 54 and driving unit 58). In accordance with the present invention, however, oscillation unit 62 and the shutter device may be omitted; or alternatively the shutter device alone may be eliminated.

Figure 8:
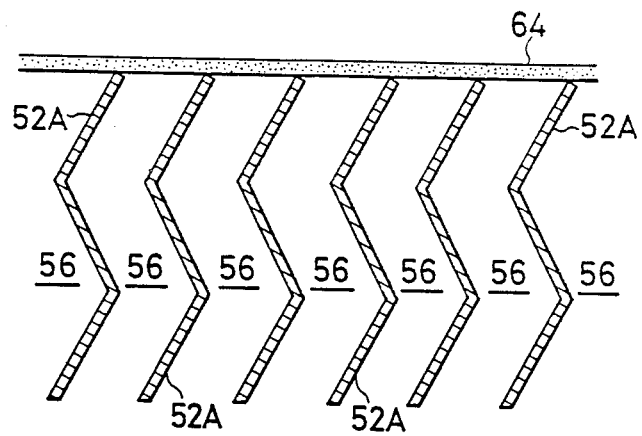
FIGS. 8 and 9 are vertical views illustrating other constructions of the shutter plate.
Figure 9:
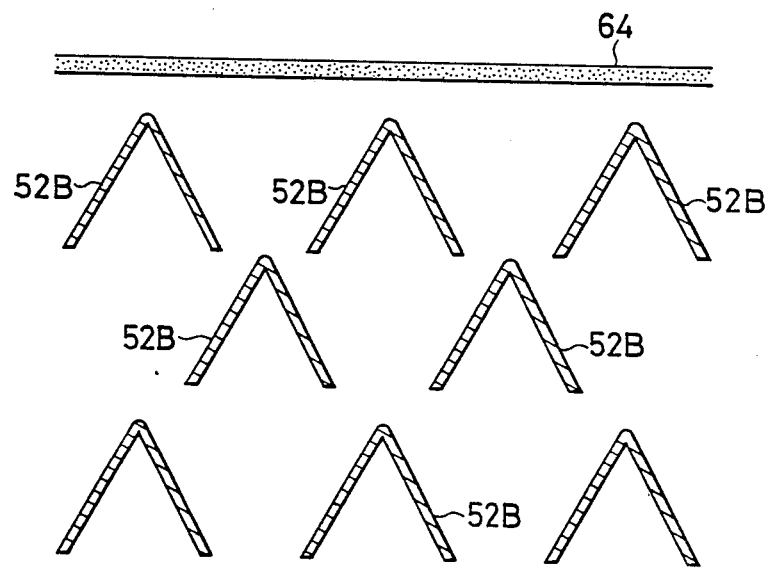

FIGS. 8 and 9 are vertical sectional views each depicting a different configuration of the scattered particle capturing plates employed in the invention. Referring first to FIG. 8, there are illustrated scattered particle capturing plates 52A each crooked substantially in an S-shape. Referring next to FIG. 9, there are shown scattered particle capturing plates 52B each assuming an inverted V-shape. Scattered particle capturing plates 52B of FIG. 9 are adopted mainly in an illustrative embodiment where the shutter device is not employed.

Turning to FIG. 9, the scattered particle capturing plates are arranged up and down on the basis of the multi-stage placement. The scattered particle capturing plates may, however, be vertically disposed at the multi-stages.

All the illustrative embodiments given above deal with the reforming furnace apparatuses. The present invention can, however, be applied to fluidized bed boilers.

Figure 10:
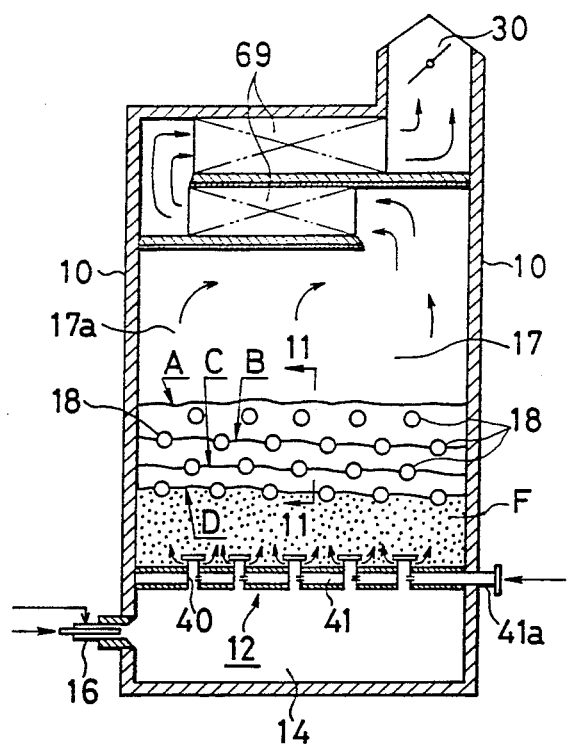
FIG. 10 is a vertical sectional view showing a further embodiment of the present invention.
Figure 11:
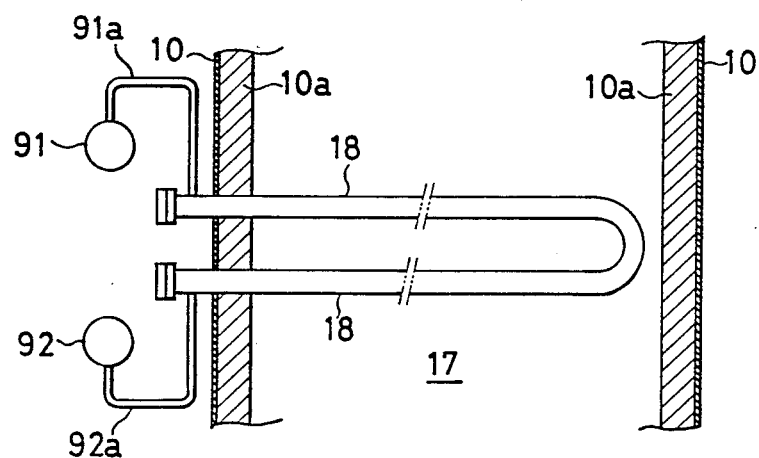
FIG. 11 is a sectional view taken substantially along the line 11—11 of FIG. 10.
Figure 12:
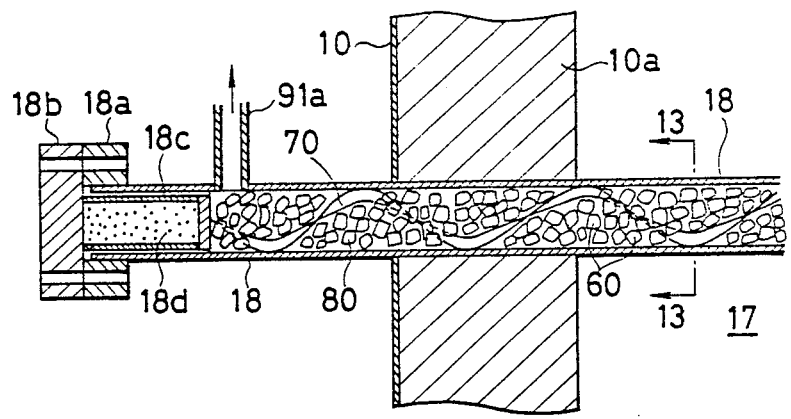
FIG. 12 is a vertical sectional view depicting a configuration of the interior of the catalyst tube.
Figure 13:
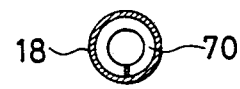
FIG. 13 is a sectional view taken substantially along the line 13—13 of FIG. 12.
Figure 14:
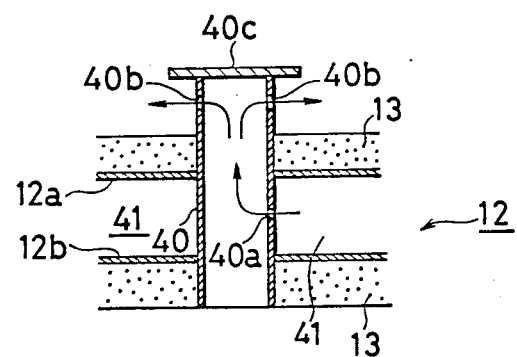
FIG. 14 is a vertical sectional view illustrating a dispersion plate.

FIG. 10 is a vertical sectional view illustrating a fluidized bed type reforming furnace in a further embodiment of the present invention. FIG. 11 a sectional view taken in the directions of arrows substantially along the line 11—11 of FIG. 10. FIG. 12 is an enlarged vertical sectional view showing a portion of a catalyst tube 18. FIG. 13 is a view, taken in the directions of arrows substantially along the line 12-12 of FIG. 12, for assistance in explaining a step of fitting a helical band. FIG. 14 is an enlarged view depicting in detail a gas dispersion plate.

A different arrangement of the apparatus in this embodiment from that of FIG. 1 will be explained as follows.

Installed upwardly of free board 17a is a preheater 69 for preheating the gas fuel supplied to gas burner 16, or the gas fuel led into the gas nozzles of a dispersion plate 12 which will be mentioned later, or the hydrocarbon fuel like the city gas by use of the combusted exhaust gas, the fuel being fed into catalysts tubes 18. Exhaust gas outlet 30 is formed on the downstream side of the gas from preheater 69.

As depicted in FIG. 14, upper and lower partition plates 12a and 12b are coated with adiabatic materials 13. Note that water pipes may be disposed to pass through upper and lower partition plates 12a and 12b as well as through adiabatic materials 13, thus providing a water cooling panel.

One end of catalyst tube 18 is, as shown in FIG. 11 in explaining the mounting step, fixed to the wall of furnace body 10; and the other end thereof is set free. Catalyst tubes 18 each bent in a U-like configuration at the free end thereof are horizontally arranged at equal spacings to differentiate their heights alternately at four stages in the up-and-down direction. Note that the symbol 10a represents an adiabatic material applied on the inner wall surface of the furnace. Flanges 18a are fixed to end surfaces of catalyst tubes 18, which are protruded outside from the furnace wall. Attached to flange 18a is a conformable flange 18b fitted with a protruded hold cylinder 18c, accommodating an adiabatic material 18d and intruded into the end portion of catalyst tube 18, for holding and keeping the catalysts with the maximum density by using an unillustrated bolt and nut in a state where a packing is interposed between flanges 18a and 18b (see FIG. 12). Catalysts 60 or a helical band 70 can be replaced by demounting conformable flange 18b. Supportably provided on boiler furnace body 10 are, as depicted in FIG. 11, an upper large diameter pipe 91 and a lower large diameter pipe 92 in upper and lower oblique positions of catalyst tube 18 to project from furnace body 10. The upper and lower protrusions of catalyst tube 18 from furnace body 10 are connected via small diameter pipes 91a and 92a to upper and lower large diameter pipes 91 and 92 so as to avoid thermal expansion. The hydrocarbon fuel like the city gas and the steam, which have been heated up to approximately 550° C., are introduced from lower large diameter pipe 92 via small diameter pipe 92a into catalyst tube 18. Subsequently introduced via upper small diameter pipe 91a of catalyst tube 18 into upper large diameter pipe 91 are hydrogen gas and carbon monoxide gas, whose temperatures generated when undergoing the external heating from the fluidized bed have reached approximately 700° C. in catalyst tube 18.

It can be observed from FIGS. 12 and 13 that catalyst tube 18 incorporates a relatively thin helical band 70 formed of stainless steel which extends over an entire length of tube 18 along the tube inner wall surface. The multiplicity of catalysts such as vanadium or nickel having a solid dimension of approximately $20\phi \times 20H$ are charged with the highest density into the portion of catalyst tube 18 which is positioned in fluidizing chamber 17. Charged in the catalyst tube 18 portion projecting outside the furnace from fluidizing chamber 17 are filler materials 80 composed of stainless steel fragments having such characteristics that even the filling of a good number of fragments maintains a considerable percentage of voids with a small resistivity of gas passage. Catalysts 60 charged in catalyst tube 18 are adapted to be kept in a state of maximum density in combination with filler materials 80 by the holding action of hold cylinder 18c of conformable flange 18b. Incidentally, in the case of filling catalyst tube 18 with catalysts 60, the catalysts may be charged together with helical band 70 till reaching the maximum density.

In the thus constructed fluidized bed type reforming furnace, the air and the gas fuel like the city gas which have been preheated by means of preheater 69 are fed to gas burner 16. Subsequently, the gas fuel is combusted in combustion chamber 14, and the resultant combusted gas is led from gas nozzles 40 into fluidizing chamber 17. At the same moment, part of the gas fuel is supplied via fuel supply ports 41a to gas fuel supply passageways 41 formed in gas dispersion plate 12, and further introduced from introduction holes 40a of gas nozzles 40 to the interior of fluidizing chamber 17. After the combusted gas has been led into fluidizing chamber 17, the fluidizing mediums filling the fluidizing chamber are fluidized and heated, thus forming fluidized bed F. Simultaneously, the gas fuel is spread over within fluidized bed F and burnt therein, whereby the fluidized bed is heated more uniformly. Catalyst tubes 18 thus undergo the heating operation with uniformity.

In accordance with this embodiment, however, when a height of fluidized bed F is varied corresponding to fluctuations in load of the reforming furnace, there are set a setting height of catalyst tubes 18, a vertical spacing between catalyst tubes 18 and an amount of the charged fluidizing mediums so that the number of catalyst tubes 18 embedded into fluidized bed F. For instance, if the load of the reforming furnace reaches the maximum value, the amounts of the gas fuels supplied both to gas burner 16 and to gas nozzles 40 and also the amount of the air supplied thereto come to their maximum values correspondingly. It follows that the height of fluidized bed F increases up to a level A shown in FIG. 10 enough to embed all of catalyst tubes 18 into fluidized bed F. Under an intermediate load, the amounts of the supplied gas fuels and air are reduced proportionally, and the height of fluidized bed F decreases down to a level B or C shown in FIG. 10. Catalyst tubes 18 of the uppermost stage or two upper stages are exposed from fluidized bed F. Moreover, under the least load, the amounts of the supplied gas fuels and air are reduced down to the minimum values, and it follows that the height of fluidized bed F drops down to a level D of FIG. 10. As a result, catalyst tubes 18 of the uppermost stage or two middle stages are exposed from fluidized bed F, whereas only catalyst tubes 18 of the lowermost stage are embedded thereinto. As discussed above, when the height of the fluidized bed varies in accordance with the fluctuations on load of the reforming furnace, the number of catalyst tubes 18 embedded into the fluidized bed increases or decreases, thereby enlarging or diminishing the area of heat transmission. Hence, a total quantity of heat transferred from fluidized bed F to catalyst tubes 18 varies corresponding to the fluctuations in load, thus minimizing a width of fluctuations in temperature of fluidized bed F. Even in a conventional case where the load of the reforming furnace decreases, a good deal of heat exchange is effected to steer clear of a sharp drop in temperature of the fluidized bed. Even under the low load, it is feasible to perform the stable operations of the reforming furnace. It is possible to follow the load-variations including the lower load and at the same time correspond quickly. The temperature of fluidized fed F is kept constant within a range of $800 \sim 900°$ C.

On the other hand, the steam and the heated hydrocarbon fuel such as the city gas or natural gas or naphtha (the description deals with the city gas in this embodiment) enter lower catalyst tubes 18, after running from lower large diameter pipe 92 to small diameter pipe 92a. The steam and the fuel smoothly pass through filler materials 80 and turn back at the U-shaped bent portion after penetrating a layer of catalysts 60. Then, the fuel and steam run through upper catalyst tubes 18. In the meantime, the gradual decomposition is effected by evenly absorbing the heat from fluidized bed F which have, as explained earlier, uniformly heated on the whole. The fuel is reformed into hydrogen and a gas having a high concentration of carbon monoxide, and thereafter discharged form upper large diameter pipe 91 via upper small diameter pipe 91a. A good deal of hydrogen gas is fed to the fuel cell. During the reforming process, along helical bands 70 in catalyst tubes 18 there are caused swirl, spiral or helical flows of the city gases, the steam or the reformed gases as raw materials within catalysts 60 charged with the maximum density. The gases and the steam uniformly flow within catalysts 60, thereby effecting the reforming process at a remarkably high efficiency. Even if gaps are formed in upper parts of catalyst tubes 18, because of the spiral flows of gases it is feasible to avoid such a phenomenon to the greatest possible degree that the gasses does not flow through the layers of lower catalysts 60 but through the upper gaps alone. Hence, partial damages to catalyst tubes 18 due to the abnormally high temperatures can be prevented, and at the same time the deterioration attributed to the local heating by catalysts 60 can also be avoided to the utmost, whereby the reforming furnace can stably be operated. Each of catalyst tubes 18 assumes the U-shape to exhibit high versatility with respect to the thermal expansion, wherein even when one ends of catalyst tubes 18 are fixed to the furnace wall, the deformation thereof is allowable, thus preventing the damages.

Catalyst tubes 18 are horizontally disposed to considerably decrease the stationary height of fluidized bed F. Hence, the reduction in loss of power as well as of pressure for fluidization can be attained. Besides, the height at which the fluidizing mediums are scattered decreases, and the height of free board 17a is thereby reduced.

The combusted gas passing through fluidized bed F further runs through free board 17a. Subsequently, the gas is led to preheater 69, in which place sensible heat is given to the gas fuel and the combustion air preparatory to the thermal exchange for preheating. After this process, the gas is discharged outside the furnace from outlet 30.

It will be obvious that the configuration of catalyst tube 18 is not limited to the U-shape in which the single tube is bent at its free end, but simple catalyst tubes 18 may vertically be arranged at the multi-stages.

In this embodiment, catalyst tubes 18 are arranged at four stages in the up-and-down direction. According to the present invention, however, the catalyst tubes may be disposed at two, three or more stages.

If helical band 70 is coated with a ceramic material to exhibit a radiation heat transmitting effect associated with far infrared rays, this effect is combined with the action of generating the helical flow to further ameliorate a heat transfer coefficient of the charged layer. This in turn makes the external area of catalyst tube 18 still smaller than before.

In the description given above, the chamber positioned under dispersion plate 12 is equipped with burner 16. Instead of the burner, however, an air supply unit may be provided therein. In this case, all the fuels fed to fluidized bed may be introduced from an introduction port 41.

Although the illustrative embodiments have been described in detail with reference to the accompanying drawings, it is to be understood that the present invention is not limited to those precise embodiments. Various changes or modifications may be effected therein by one skilled in the art without departing from the scope or spirit of the invention.

What is claimed is:

1. A fluidized bed apparatus having fluidizing mediums therein, comprising,
   a furnace body having a combusted gas outlet at an upper portion thereof,
   a filter mounted in the gas outlet for capturing the fluidizing mediums scattered from the fluidized bed,
   a plurality of compartments attached to the gas outlet above the filter so that exhaust gas flows outwardly through the compartments,
   closing means attached to the compartments to independently control communication between the compartment and outside of the furnace, respectively,
   nozzles attached to the respective compartments between the closing means and the filter so that pressurized fluid is ejected to the filter for removing fluidizing mediums attached to the filter when the compartment is closed by the closing means,
   a dispersion plate horizontally disposed inside the furnace body for separating an interior of the furnace body into an upper fluidizing chamber and a lower chamber, and
   heat transfer tubes arranged in the fluidizing chamber to receive heat from the fluidized bed.

2. The apparatus as set forth in claim 1, wherein said heat transfer tubes are horizontally disposed in the fluidizing chamber, said heat transfer tubes containing catalysts therein for reforming hydrocarbon gas.

3. The apparatus as set forth in claim 2, wherein each heat transfer tube has a U shape with longitudinal portions, said longitudinal portions being vertically spaced apart from each other.

4. The apparatus as set forth in claim 3, wherein said heat transfer tubes comprise two groups of tubes, each group being arranged in different height.

5. The apparatus as set forth in claim 1, wherein a lower surface of said filter is coated with a coating material having a higher radiation rate than that of said filter.

6. The apparatus as set forth in claim 1, wherein an inner wall surface of said free board is coated with a coating material having a higher radiations rate than that of said filter.

7. The apparatus as set forth in claim 1, wherein said filter involves the use of a porous ceramic plate.

8. A fluidized bed apparatus having fluidizing mediums therein, comprising,
   a furnace body having a combusted gas outlet at an upper portion thereof,
   a filter mounted in the gas outlet for capturing the fluidizing mediums scattered from the fluidized bed,
   a dispersion plate horizontally disposed inside the furnace body for separating an interior of the furnace body into an upper fluidizing chamber and a lower chamber, said dispersion plate including a pair of partition plates spaced apart from each other to form a fuel gas supply space therebetween, and a plurality of nozzles extending through the partition plates, each nozzle having a lower part communicating with the lower chamber, an upper part communicating with the fluidizing chamber, and a middle part with at least one opening communicating with the fuel gas supply space so that fuel is supplied to the nozzles from the fuel gas supply space through the opening, and
   heat transfer tubes arranged in the fluidizing chamber to receive heat from the fluidized bed.

9. The apparatus as set forth in claim 8, wherein said lower chamber includes a gas burner to burn fuel therein.

10. The apparatus as set forth in claim 8, wherein a burner is mounted on the wall of said lower chamber so that the combusted gas is fed to said lower chamber than said gas dispersion plate.

11. The apparatus as set forth in claim 8, wherein the interiors of said heat transfer tubes are charged with catalysts for reforming hydrocarbon gas.

12. The apparatus as set forth in claim 11, wherein said heat transfer tubes comprise two groups of tubes, each group having a different height at which said tubes are horizontally placed.

13. The apparatus as set forth in claim 12, wherein the interior of each of said heat transfer tubes is provided with a helical band member extending in the longitudinal direction of said tube.

* * * * *

UNITED STATES PATENT AND TRADEMARK OFFICE
CERTIFICATE OF CORRECTION

PATENT NO. : 4,966,101

DATED : October 30, 1990

INVENTOR(S) : Sadahiko Maeda et al

It is certified that error appears in the above-identified patent and that said Letters Patent is hereby corrected as shown below:

Cover page, inventor's section, third inventor's name, change "Shinji Matsurra" to --Shinji Matsuura--.

Signed and Sealed this

Tenth Day of March, 1992

Attest:

HARRY F. MANBECK, JR.

Attesting Officer

Commissioner of Patents and Trademarks